United States Patent [19]

Ryan et al.

[11] 4,184,514

[45] Jan. 22, 1980

[54] VALVE SYSTEM INCORPORATING SINGLE FAILURE PROTECTION LOGIC

[75] Inventors: Rodger Ryan, San Jose; Walter J. H. Timmerman, Saratoga, both of Calif.

[73] Assignee: The United States of America as represented by the United States Department of Energy, Washington, D.C.

[21] Appl. No.: 868,634

[22] Filed: Jan. 11, 1978

[51] Int. Cl.² ............................................. G21C 17/00
[52] U.S. Cl. ...................................... 137/861; 91/48; 137/885; 176/24
[58] Field of Search ..................... 91/48; 137/861, 885; 176/24, 36

[56] References Cited

U.S. PATENT DOCUMENTS 3,223,590  12/1965  Troeger ................................ 176/24

Primary Examiner—Gerald A. Michalsky
Attorney, Agent, or Firm—R. V. Lupo; L. E. Carnahan

[57] ABSTRACT

A valve system incorporating single failure protective logic. The system consists of a valve combination or composite valve which allows actuation or de-actuation of a device such as a hydraulic cylinder or other mechanism, integral with or separate from the valve assembly, by means of three independent input signals combined in a function commonly known as two-out-of-three logic. Using the input signals as independent and redundant actuation/de-actuation signals, a single signal failure, or failure of the corresponding valve or valve set, will neither prevent the desired action, nor cause the undesired action of the mechanism.

5 Claims, 3 Drawing Figures

ILLUSTRATION NO. 1

ILLUSTRATION NO.2

ILLUSTRATION NO.3

LEGEND

1: OPEN DE-ENERGIZED
2: CLOSED DE-ENERGIZED
3: COMMON

— VALVE SYMBOLS

A,B: VOLUMES ENCLOSED BETWEEN CLOSED VALVES
C  : TO CYLINDER OR ACTUATED MECHANISM
P  : PRESSURE SUPPLY (FLOW CAPACITY MUCH SMALLER THAN V)
V  : VENT

| EXAMPLE OF TEST SEQUENCE FOR TEST IN NORMAL OPERATIONAL CONDITIONS ALL TESTS START FROM abc CONDITIONS (REF. ILL. #1) | TEST METHOD | | | | |
|---|---|---|---|---|---|
| | VENT FLOW MEASUREMENT | | | PRESSURE MEASUREMENT | |
| | INITIAL PRESSURE & VOLUME | MIXING VOLUME | VENTED VOLUME | PRESSURE CHANGE | |
| | | | | VOLUME A | VOLUME B |
| a̅bc → abc → a̅bc | P(A+B) | A+B | —* | P→P | P→P |
| ab̅c → abc → ab̅c | P(A+B) | A+B | A | P→V | P→P |
| a̅bc → abc → abc̅ | P(A+B) | A+B | A+B | P→V | P→V |
| abc → abc → a̅bc | P(B) | A+B | A | V→V | P→P |
| ab̅c   abc   ab̅c | P(B) | A+B | A+B | V→V | P→V |
| ab̅c   abc   abc̅ | P(B) | A+B | —* | V→P | P→P |
| abc̅   abc   abc̅ | V(A+B) | A+B | A+B | V→V | V→V |
| abc̅   abc   ab̅c | V(A+B) | A+B | —* | V→P | V→P |
| abc̅   abc   abc̅ | V(A+B) | A+B | A* | V→V | V→P |

* NO VENT

Fig. 3

VALVE SYSTEM INCORPORATING SINGLE FAILURE PROTECTION LOGIC

BACKGROUND OF THE INVENTION

The invention described herein was made in the course of, or under, a contract with the United States Department of Energy.

The invention relates to a valve system for actuation or de-actuation of a device, and more particularly to a valve system incorporating single failure protection logic.

Valve systems for applications such as actuation or de-actuation of a control rod assembly of a nuclear reactor are known in the art. However, prior known valve systems for reactor scram applications have not incorporated the single failure criteria which protects against spurious action in case of a single failure, nor allowed for testing of the valves during normal operational conditions without either causing or preventing the safety action as required by the reactor protective systems.

SUMMARY OF THE INVENTION

The present invention provides a simple valve system, which incorporates single failure protection logic for a control rod system of a nuclear reactor, by means of three independent input signals combined in a function commonly known as two-out-of-three logic, which meets the above-mentioned single failure criteria while allowing testing of the actuating valves during normal operation of the reactor protective systems. Using the input signals as independent and redundant actuation/de-actuation signals, a single failure, or failure of the corresponding valve assembly or valve set, will neither prevent the desired action nor cause the undesired action of the associated mechanism.

Therefore, it is an object of the invention to provide a valve system which incorporates a single failure protection logic.

A further object of the invention is to provide a valve system which allows actuation or de-actuation of a device by means of three independent input signals combined in a function known as two-out-of-three logic.

Another object of the invention is to provide a valve system wherein a single signal failure, or failure of the corresponding valve, will neither prevent the desired action nor cause the undesired action of an associated mechanism.

Another object of the invention is to provide a valve system which allows testing of the system valves during normal operational conditions without either causing or preventing the action as required by the associated mechanism.

Other objects of the invention will become readily apparent from the following descriptions and accompanying drawings.

BRIEF DESCRIPTION OF THE DRAWINGS

FIG. 3 is a chart setting forth test sequence of the valve system.

DETAILED DESCRIPTION OF THE BEST MODE CONTEMPLATED

The invention involves a valve system composed of a valve combination or composite valve, which allows actuation or de-actuation of a device, such as a hydraulic cylinder or other mechanism, integral with or separate from the valve assembly, by means of three independent input signals combined in a function known as two-out-of-three logic. Representing the mutually exclusive actuation and de-actuation signals respectively by the logic symbols a, b, c, and $\bar{a}, \bar{b}, \bar{c}$, the conditions for actuation and de-actuation can be expressed respectively by the Boolean equations $ab+bc+ca+abc$ and $\bar{a}\bar{b}+\bar{b}\bar{c}+\bar{c}\bar{a}+\bar{a}\bar{b}\bar{c}$, or equivalent variations thereof.

Using the input signals as independent and redundant actuation/de-actuation signals, a single signal failure, or failure of the corresponding valve assembly or valve set, will neither prevent the desired action nor cause the undesired action of the associated mechanism. In addition, it is possible to test the functioning of all system components during normal operational conditions without preventing desired action or causing undesired action of the associated mechanism, by inverting one and one only of the input signals at a time relative to the condition corresponding to the desired action. The simplified logic configurations, illustrated in FIG. 1, utilizing a minimum number of valves and no external logic circuits, result in greatly improved system reliability.

The valve system of this invention applied to reactor protective systems, such as for example, scram actuation valves, meets the single failure criteria established for the control rod system of liquid metal breeder reactors, and, in addition, protects against spurious action in case of a single failure. This valve system also allows testing of the reactor protective system actuating valves during normal operational conditions without either causing or preventing the safety action as required by the reactor protective system.

Figure 1:
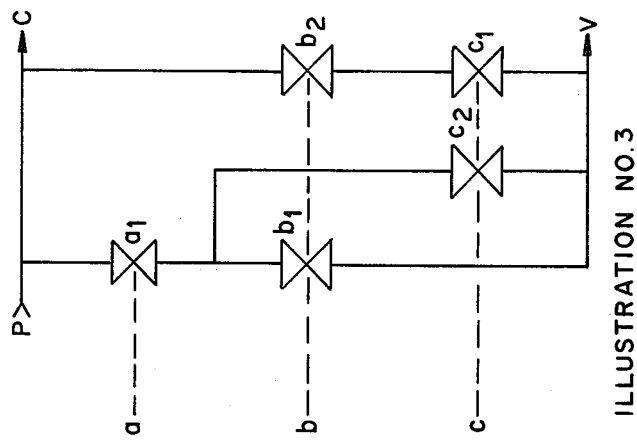
FIG. 1 schematically illustrates simplified logic configurations for the valve system of the invention.
Figure 1:
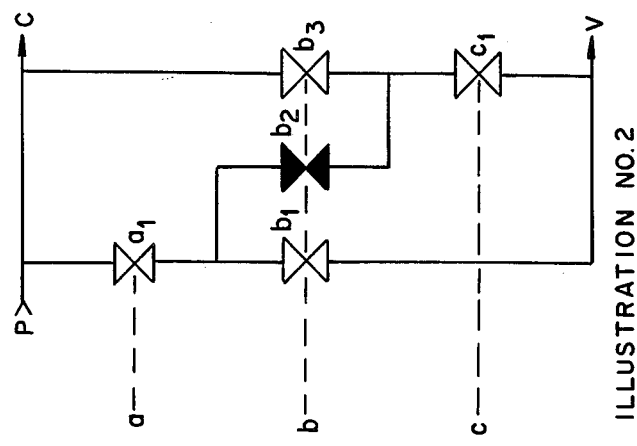
Figure 1:
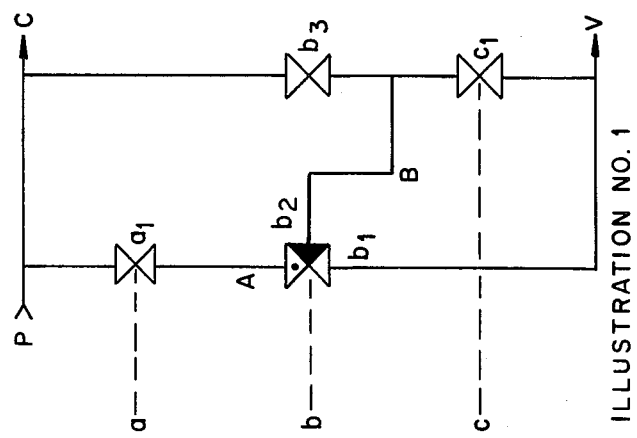

FIG. 1 illustrates three simplified logic configurations identified as Illustrations #1, 2, and 3, with the valve symbols, legends, and reference components identified therein, and described in greater detail hereinafter.

An example of test sequence for tests in normal operational conditions with all tests starting from abc conditions, with reference to Illustration #1 of FIG. 1 is set forth in FIG. 3.

Figure 2:
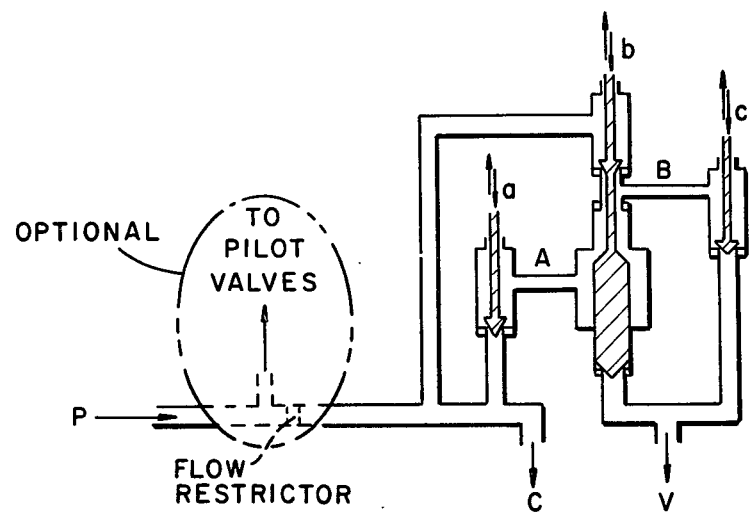
FIG. 2 schematically illustrates an embodiment of the valve system made in accordance with the invention.

FIG. 2 illustrates an embodiment of the physical configuration of the valve system for the logic configuration of Illustration #1 of FIG. 1, with corresponding references. With respect to the FIG. 2 embodiment, note the following:

(1) a,b,c represents valve actuation/de-actuation forces, the valves being shown in the energized position;

(2) a,b,c can be initiated by solenoids, pilot valves, or other mechanisms (pilot valves can use supply P if flow restriction R between P and C is provided).

(3) Safety action corresponds with the de-energized condition of the valves;

(4) The valve system is fail-safe in the sense that any leakages can only result in the safety action;

(5) The 3-way valve section of b is designed for negligible bypass during change-over.

The following specific forms of the Boolean equation referenced above constitute an equivalent definition of the utilization of a minimum number of valves (or switching functions) to perform a two-out-of-three logic function, as symbolically represented in Illustrations #1, 2 and 3 of FIG. 1:

For Illustrations #1 and 2:

$$a_1(b_1+b_2c_1)+b_3c_1$$

Wherein:
Prob a = Prob $a_1$
Prob b = Prob $b_1$ = 1- Prob $b_2$ = Prob $b_3$
Prob c = Prob $c_1$
and a, b, c are independent actuation events.

For Illustration #3:

$$a_1(b_1+c_2)+b_2c_1$$

Wherein:
Prob a = Prob $a_1$
Prob b = Prob $b_1$ = Prob $b_2$
Prob c = Prob $c_1$ = Prob $c_2$
and a, b, c are independent actuation events.

It has thus been shown that the present invention provides a valve system incorporating single failure protection logic wherein a valve combination or composite valve allows actuation or deactuation of a device, such as a hydraulic cylinder, by means of three independent input signals, a, b, c combined in a function known as two-out-of-three logic and expressed in the Boolean equation ab+bc+ca or equivalent variations of this equation. The valve system of this invention, when applied to reactor protective systems, meets the single failure criteria, and protects against spurious action in case of a single failure. This allows testing of the scram valves during operational conditions without either causing or preventing the safety action as required by the reactor protective system.

While particular embodiments of the invention have been illustrated or described, modifications will become apparent to those skilled in the art, and it is intended to cover in the appended claims all such modifications as come within the spirit and scope of the invention.

What is claimed is:

1. A valve system utilizing three independent input signals combined in a two-out-of-three logic function for actuation of de-actuation of a normally pressurized associated mechanism operatively connected to a pressure supply and a vent, comprising: valve means composed of a plurality of valve assemblies positioned intermediate an associated pressure supply, a vent, and an associated mechanism to be actuated or de-actuated; a first pair of said valve assemblies being positioned intermediate an associated pressure supply and a vent, a second pair of said valve assemblies being positioned intermediate a vent and an associated mechanism to be actuated or de-actuated; valve actuation/de-actuation signals a, b, and c, for actuation/de-actuation of said valve means; and means for initiating said signals a, b, and c; whereby failure of one of signals a, b, and c, or failure of a corresponding valve assembly will neither prevent nor cause action of an associated mechanism.

2. The valve system defined in claim 1, wherein another of said valve assemblies is in common with one of said first pair of valve assemblies positioned intermediate an associated pressure supply and said vent, and having an ouput therefrom connected intermediate said second pair of valve assemblies positioned intermediate said vent and an associated mechanism.

3. The valve system defined in claim 1, wherein another of said valve assemblies is positioned so as to have an input connected intermediate said first pair of valve assemblies and an output connected intermediate said second pair of valve assemblies.

4. The valve system defined in claim 1, wherein another of said valve assemblies is positioned so as to have an input connected intermediate said first pair of valve assemblies and an output connected to an output of one of said first pair of valve assemblies.

5. The valve system defined in claim 1, wherein said actuation/de-actuation signals define logic symbols a,b,c and $\bar{a},\bar{b},\bar{c}$ and conditions of actuation and de-actuation are expressed by Boolean equations ab+bc+ca+abc, $\bar{a}\bar{b}+\bar{b}\bar{c}+\bar{c}\bar{a}+\bar{a}\bar{b}\bar{c}$, and equivalent variations thereof.

* * * * *